(12) United States Patent
Shang et al.

(10) Patent No.: US 10,594,748 B2
(45) Date of Patent: Mar. 17, 2020

(54) ESTABLISHING A CONVERSATION BETWEEN INTELLIGENT ASSISTANTS

(71) Applicant: INTERNATIONAL BUSINESS MACHINES CORPORATION, Armonk, NY (US)

(72) Inventors: Kun Shang, Beijing (CN); Ting Yin, Beijing (CN); Yin Xia, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 15/805,561

(22) Filed: Nov. 7, 2017

(65) Prior Publication Data

US 2019/0141097 A1    May 9, 2019

(51) Int. Cl.
*G06F 15/16* (2006.01)
*H04L 29/06* (2006.01)
*H04L 29/08* (2006.01)

(52) U.S. Cl.
CPC ........ *H04L 65/403* (2013.01); *H04L 65/1069* (2013.01); *H04L 67/10* (2013.01)

(58) Field of Classification Search
CPC .............................. H04L 65/403; H04L 67/10
USPC .................................. 709/202–205, 227–228
See application file for complete search history.

(56) References Cited

U.S. PATENT DOCUMENTS

| | | | |
|---|---|---|---|
| 6,735,632 B1* | 5/2004 | Kiraly | .................. G06F 16/951 709/202 |
| 7,552,393 B2 | 6/2009 | Hayes-Roth | |
| 8,560,615 B2 | 10/2013 | Buchheit et al. | |
| 8,943,024 B1 | 1/2015 | Gardner et al. | |
| 9,135,311 B2 | 9/2015 | Decker et al. | |
| 10,251,115 B2* | 4/2019 | Coglon | ............... H04L 65/1066 |
| 2014/0108800 A1* | 4/2014 | Lawrence | ............. H04L 9/3297 713/168 |
| 2015/0186156 A1 | 7/2015 | Brown et al. | |

(Continued)

FOREIGN PATENT DOCUMENTS

| | | |
|---|---|---|
| CN | 2791791 | 6/2006 |
| WO | WO 2015031486 | 3/2015 |

OTHER PUBLICATIONS http://voices.uchicago.edu/201702busn3910001/2017/05/17/x-ai-personal-assistant-to-schedule-meetings-profile/comment-page-1/.

*Primary Examiner* — Bharat Barot
(74) *Attorney, Agent, or Firm* — F. Chau & Associates, LLC

(57) ABSTRACT

A computer-implemented method of establishing a conversation between intelligent assistants includes subdividing content of a user's conversation monitored over a predetermined period of time into a plurality of segments, and associating a time stamp with each segment; hashing each of the plurality of segments wherein a hash value is associated with each segment; matching pairs of the hash values and their time stamps with hash values and time stamps received from one or more intelligent assistants associated with the one or more other persons; and establishing a connection between the user's intelligent assistant and an intelligent assistant of at least one of the one or more other persons, when the user's hash value and time stamp for one or more segments of the conversation match hash values and time stamps of one or more conversation segments of the at least one of the one or more other persons.

12 Claims, 4 Drawing Sheets

(56) References Cited

U.S. PATENT DOCUMENTS

| | | | |
|---|---|---|---|
| 2015/0215350 A1 | 7/2015 | Slayton et al. | |
| 2017/0124462 A1 | 5/2017 | Arbajian et al. | |
| 2017/0192994 A1* | 7/2017 | Hong | G06F 16/164 |
| 2017/0339249 A1* | 11/2017 | Forster | H04L 65/601 |
| 2018/0204636 A1* | 7/2018 | Edwards | G16H 40/67 |
| 2018/0260680 A1* | 9/2018 | Finkelstein | G06N 3/006 |

* cited by examiner

ESTABLISHING A CONVERSATION BETWEEN INTELLIGENT ASSISTANTS

TECHNICAL FIELD

Embodiments of the present disclosure are directed to methods for identifying and pairing intelligent assistants to establish connections with each other to perform collaborative tasks, when two or more people are communicating with each other.

DISCUSSION OF THE RELATED ART

When making schedules with others via phone or face to face, people normally need to check their calendar manually, and send an invitation to reserve the time. Intelligent assistants, such as Siri, Cortana and similar mobile phone assistants, are popular on smart phones and can help people in checking their calendars and taking proper action. However, users still have to tell the intelligent assistant specific action verbs, as well as the contact object, if they need assistance. Furthermore, if people are talking physically face to face or over a video conference not connected via a mobile phone, the intelligent assistants are unable to collaborate with each other.

SUMMARY

Exemplary embodiments of the present disclosure are directed to methods for establishing connections between different intelligent assistants, based on hashed conversation content monitored by the intelligent assistants. Embodiments of the disclosure can be used in a multi-task meeting or conversation in which an intelligent assistant connects with other intelligent assistants owned by different person to perform a collaborative task, without interrupting the communication between participants.

According to an embodiment of the disclosure, there is provided a computer-implemented method of establishing a conversation between intelligent assistants, including monitoring, by an intelligent assistant installed in a computing device, a conversation between a user of said computing device and one or more other persons, in real-time, determining, by the intelligent assistant, that a connection needs to be established with at least one other intelligent assistant associated with one of the one or more other persons, subdividing content of the user's conversation monitored over a predetermined period of time into a plurality of segments, and associating a time stamp with each segment, hashing each of the plurality of segments wherein a hash value is associated with each segment, transmitting the user's hash values and time stamps for each segment to a cloud-based server for matching pairs of the hash values and their time stamps with hash values and time stamps received from one or more intelligent assistants associated with the one or more other persons, and establishing a connection between the user's intelligent assistant and an intelligent assistant of at least one of the one or more other persons, when, based on the matching, the user's hash value and time stamp for one or more segments of the conversation match hash values and time stamps of one or more conversation segments of the at least one of the one or more other persons.

According to a further embodiment of the disclosure, monitoring the conversation includes capturing voice content over the predetermined period of time, converting the voice content to text, and saving the text in a computer-accessible storage.

According to a further embodiment of the disclosure, subdividing the user's conversation content monitored over a predetermined period of time into a plurality of segments comprises subdividing the predetermined period of time into subintervals and subdividing the conversation content text into segments that correspond to each subinterval, wherein each time stamp is associated with a subinterval of the predetermined period of time According to a further embodiment of the disclosure, subdividing the user's conversation content monitored over a predetermined period of time into a plurality of segments comprises subdividing the conversation content text into segments that have a same number of units, wherein a unit is one of a character, a word, or a sentence.

According to a further embodiment of the disclosure, matching pairs of the hash values and their time stamps with hash values and time stamps received from one or more intelligent assistants associated with the one or more other persons includes comparing a user's segment time stamp with a segment time stamp received from one of the one or more intelligent assistants associated with the one or more other persons, and comparing a user's segment hash value with a segment hash value received from one of the one or more intelligent assistants associated with the one or more other persons.

According to a further embodiment of the disclosure, each of the one or more other persons is monitoring the conversation using an intelligent assistant installed in each of their computing devices.

According to an embodiment of the disclosure, there is provided a non-transitory program storage device readable by a computer, tangibly embodying a program of instructions executed by the computer to perform the method steps for establishing a conversation between intelligent assistants, including monitoring, by an intelligent assistant installed in a computing device, a conversation between a user of said computing device and one or more other persons, in real-time, by capturing voice content over the predetermined period of time, converting the voice content to text, and saving the text in a computer-accessible storage, determining, by the intelligent assistant, that a connection needs to be established with at least one other intelligent assistant associated with one of the one or more other persons, subdividing content of the user's conversation monitored over a predetermined period of time into a plurality of segments, and associating a time stamp with each segment, hashing each of the plurality of segments wherein each segment has an associated hash value, and transmitting the user's hash values and time stamps for each segment to a cloud-based server.

According to a further embodiment of the disclosure, the method includes matching, by the cloud based server, pairs of the hash values and their time stamps with hash values and time stamps received from one or more intelligent assistants associated with the one or more other persons, and establishing, by the cloud-based server, a connection between the user's intelligent assistant and an intelligent assistant of at least one of the one or more other persons, when the user's hash value and time stamp for one or more segments of the conversation match hash values and time stamps of one or more conversation segments of the at least one of the one or more other persons.

According to a further embodiment of the disclosure, matching pairs of the hash values and their time stamps with hash values and time stamps received from one or more intelligent assistants associated with the one or more other persons includes comparing a user's segment time stamp with a segment time stamp received from one of the one or more intelligent assistants associated with the one or more other persons, and comparing a user's segment hash value with a segment hash value received from one of the one or more intelligent assistants associated with the one or more other persons.

According to a further embodiment of the disclosure, subdividing the user's conversation content monitored over a predetermined period of time into a plurality of segments comprises subdividing the predetermined period of time into subintervals and subdividing the conversation content text into segments that correspond to each subinterval, wherein each time stamp is associated with a subinterval of the predetermined period of time According to a further embodiment of the disclosure, subdividing the user's conversation content monitored over a predetermined period of time into a plurality of segments comprises subdividing the conversation content text into segments that have a same number of units, wherein a unit is one of a character, a word, or a sentence.

According to a further embodiment of the disclosure, each of the one or more other persons is monitoring the conversation using an intelligent assistant installed in each of their computing devices.

According to an embodiment of the disclosure, there is provided a non-transitory program storage device readable by a computer, tangibly embodying a program of instructions executed by the computer to perform the method steps for establishing a conversation between intelligent assistants, including receiving, by a cloud based server, hash values and time stamps for a plurality of conversation text segments for two or more person-to-person conversations from two or more intelligent assistants residing in respective computing devices, wherein each of the two or more conversations includes some of the plurality of conversation text segments, matching, by the cloud based server, pairs of the hash values and their time stamps received from a first of the two or more intelligent assistants with hash values and time stamps received from at least a second of the two or more intelligent assistants, and establishing, by the cloud-based server, a connection between the first intelligent assistant and the at least second intelligent assistant of the two or more intelligent assistants, when the hash values and time stamps for one or more segments of the conversation received from the first intelligent assistant match hash values and time stamps of one or more conversation segments received from the at least second intelligent assistant. Matching pairs of the hash values and their time stamps received from a first of the two or more intelligent assistants with hash values and time stamps received from at least a second of the two or more intelligent assistants includes comparing a segment time stamp received from the first intelligent assistant with a segment time stamp received from the at least second intelligent assistant, and comparing a segment hash value received from the first intelligent assistant with a segment hash value received from the at least second intelligent assistant.

According to a further embodiment of the disclosure, the method includes monitoring, by one of the two or more intelligent assistants, a conversation between a user of a computing device of said one of the two or more intelligent assistants and one or more other persons, in real-time, determining, by the intelligent assistant, that a connection needs to be established with at least one other intelligent assistant associated with one of the one or more other persons, subdividing content of the user's conversation monitored over a predetermined period of time into a plurality of segments, and associating a time stamp with each segment, hashing each of the plurality of segments wherein a hash value is associated with each segment, and transmitting the user's hash values and time stamps for each segment to a cloud-based server.

According to a further embodiment of the disclosure, monitoring the conversation includes capturing voice content over the predetermined period of time, converting the voice content to text, and saving the text in a computer-accessible storage.

According to a further embodiment of the disclosure, subdividing the user's conversation content monitored over a predetermined period of time into a plurality of segments comprises subdividing the predetermined period of time into subintervals and subdividing the conversation content text into segments that correspond to each subinterval, wherein each time stamp is associated with a subinterval of the predetermined period of time.

According to a further embodiment of the disclosure, subdividing the user's conversation content monitored over a predetermined period of time into a plurality of segments comprises subdividing the conversation content text into segments that have a same number of units, wherein a unit is one of a character, a word, or a sentence.

According to a further embodiment of the disclosure, each of the one or more other persons is monitoring the conversation using an intelligent assistant installed in each of their computing devices.

DETAILED DESCRIPTION OF EXEMPLARY EMBODIMENTS

Figure 1:
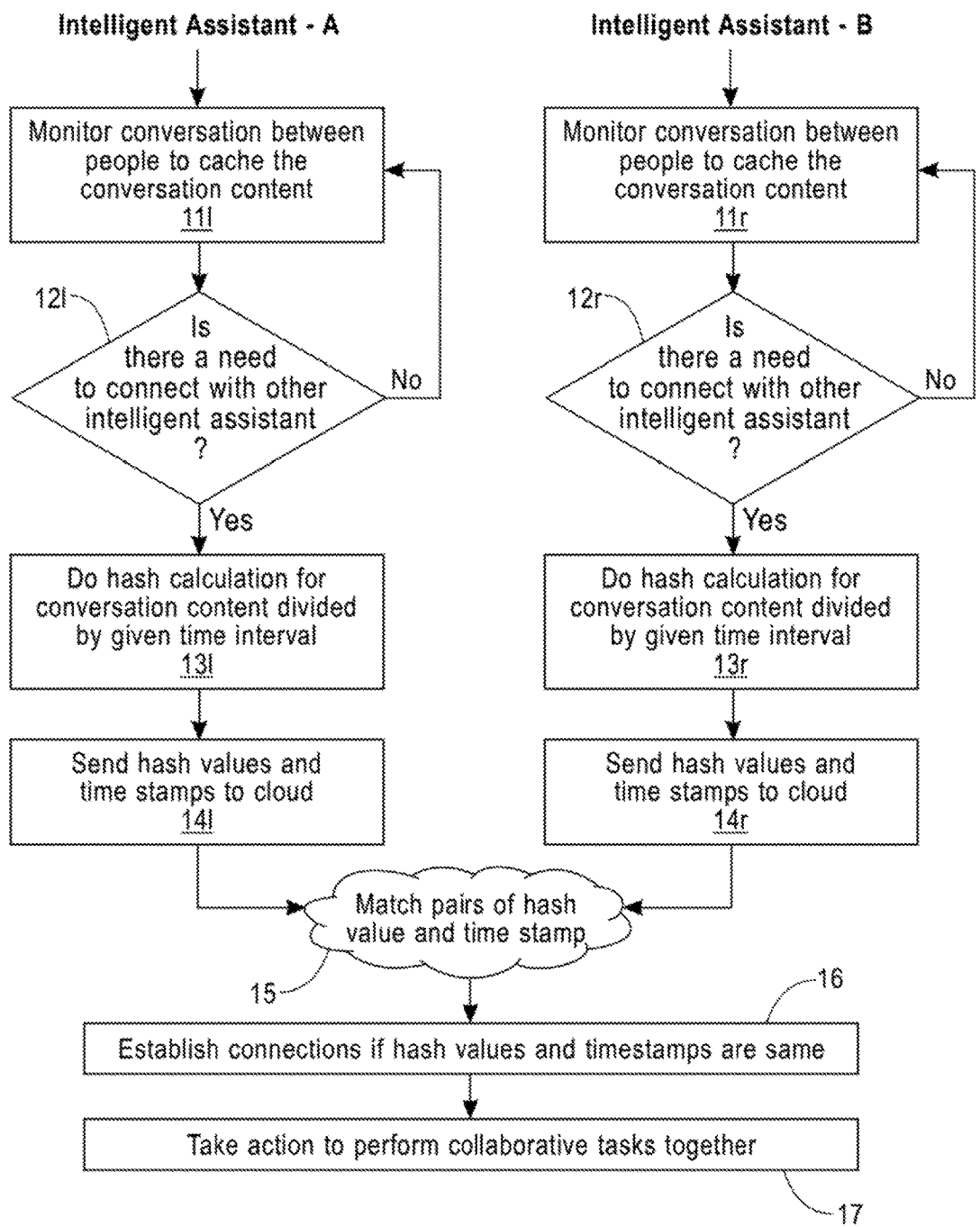
FIG. 1 is a flow chart of a method of establishing a connection between two intelligent assistants, according to an embodiment of the disclosure.

Exemplary embodiments of the disclosure as described herein generally provide systems and methods for establishing connections between different intelligent assistants, based on hashed conversation content monitored by the intelligent assistants. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

When a group of people meet together, locally or remotely, it would be helpful if smart is phone assistants can intelligently establish conversations between all participants that plan to meet. Accordingly, intelligent assistants can perform tasks for a person. Moreover, an intelligent assistant can connect with other intelligent assistants owned by different people to perform a collaborative task. In that case, these intelligent assistants, which are involved in this collaborative task, need to identify each other for establishing connection among the intelligent assistants.

According to embodiments of the disclosure, an intelligent assistant (IA) can monitor a conversation between two or more persons, capture the voice content over a period of time, convert the voice to text and save the text in a memory, such as a local cache. An IA can subdivide the conversation according to time intervals, label each time interval with a time stamp, and perform hash operations based on the conversation content text in the time interval. Each hash value is associated with the time stamp of the conversation content, which will generate an identification code. All IAs in a given conversation will send their identification codes to a cloud sever for matching with other IAs. Within a predefined range, the IAs with the same identification codes would connect with each other to establish a group conversation. For privacy and security, only the identification codes of the conversation content, not the content itself, would be exposed on the cloud. By using a method according to an embodiment, different assistants can efficiently identify correct target assistants, and establish conversations in a real-time model. Users do not need to tell their assistants which target users should be contacted. The assistants do not need to analyze user habit data. Moreover, all conversation content is securely protected.

According to embodiments of the disclosure, there are provided a series of steps as follows, with reference to the steps of the flowchart of FIG. 1.

A first step of a method according to an embodiment involves monitoring a conversation between 2 or more persons. Intelligent assistants (IAs) owned by different persons monitor the conversation between these persons whenever a monitoring request is received. For example, in FIG. 1, Intelligent Assistant A in User A's mobile unit monitors a conversation of User A with User B and caches the conversation content at step 11*l*, and Intelligent Assistant B in User B's mobile unit monitors a conversation of User B with User A and caches the conversation content at step 11*r*. The conversation between the users can be a face-to-face interaction or an online voice communication via telephone or the Internet. At steps 12*l* and 12*r*, the respective Intelligent Assistants A and B determine whether they need to connect with each other. The Intelligent Assistants A and B will continue to monitor the conversations between their owners at steps 11*l* and 11*r* until it is determined that a connection between them needs to be established. The determination of whether a connection should be established can be made automatically by using existing cognitive technologies, or by a user be means of, e.g., activating a button or a voice commend. The monitoring request can be activated by an intentional user action, such as clicking a button or a voice command, or the request can be triggered by the real-time monitoring of the conversation by the IAs. Exemplary, non-limiting criteria for cognitively determining whether to monitor a conversation and for whether to establish a connection, are disclosed in U.S. Patent Publ. No. 20170124462, "Cognitive intention detection system, method, and recording medium for initiating automated workflow in multimodal messaging" of Arbajian, et al., assigned to the assignee of the present application, the contents of which are herein incorporated by reference in their entirety.

According to embodiments, the voice content captured during monitoring is converted as needed into text by a speech recognition application, and the voice content and converted text captured over a period of time is saved in a local cache or other storage for further processing.

Once it is determined that a connection should be established, a second step of a method according to an embodiment involves hashing subdivided conversation content on demand. An IA can perform a hash calculation for the conversation content when there is a need to connect with other IAs, or to prepare for a possible future connection request. Referring again to FIG. 1, at step 13*l* and 13*r*, the respective intelligent Assistants A and B perform the hash calculations for each subdivided segment of the conversation content.

Figure 2:
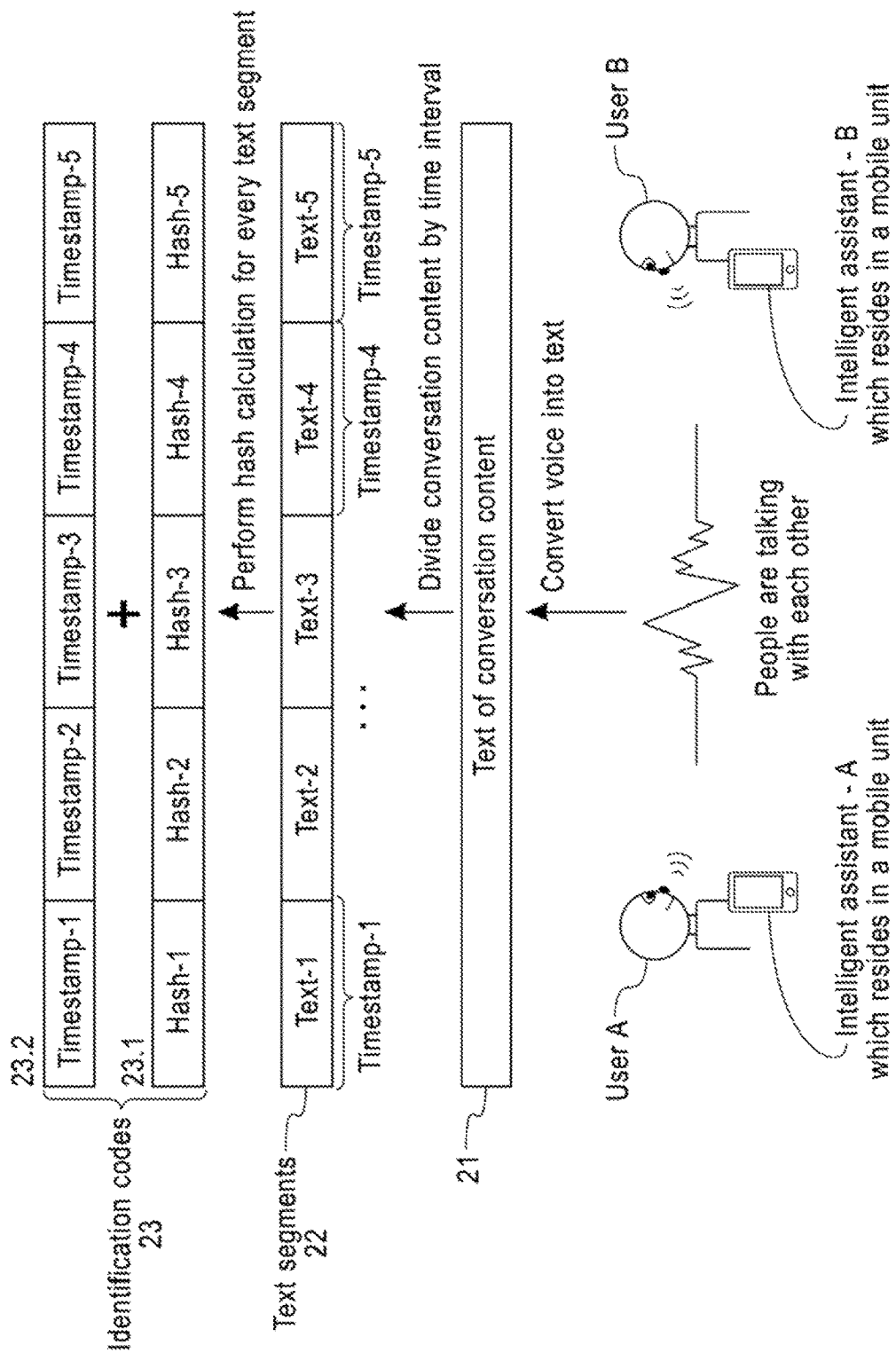
FIG. 2 illustrates how text of a conversation is converted into identification codes, according to an embodiment of the disclosure.

A hash calculation according to an embodiment is performed as follows, with reference to FIG. 2. FIG. 2 shows, at the bottom of the figure, User A talking to User B via mobile phones over a wireless connection. Intelligent Assistant A resides in User A's mobile smartphone, and Intelligent Assistant B resides in User B's mobile smartphone. It is to be understood, however, that the depiction of two users is for simplicity of exposition, and embodiments of the disclosure are not limited thereto. For example, the conversation could be a group conversation of 3 or more people in other embodiments.

First, according to embodiments, the text of a conversation's content 21 is subdivided into text segments 22 by a given time interval. For example, let conversation content from 15:05 to 15:10 be one segment, and content from 15:10 to 15:15 be another segment. Before subdividing, all IAs synchronize with a cloud-based time, and use the same rule to subdivide the conversation content. A series of time stamps 23.2, one for each content segment, is generated by the process of subdividing the content.

Alternatively, according to other embodiments, the conversation content can be subdivided so that each section has an equal number of characters, words, or sentences.

A hash calculation is then performed for each segment of subdivided conversation content to generate a hash value from the content of that segment, to create a list of hash values 23.1. Each hash value is combined with the time stamp of the conversation content segment used to generate the hash value serves as an identification code 23, which is used for matching with other IAs on the cloud. Each intelligent assistant can have multiple identification codes, one for each segment. All AIs sends their identification codes to a cloud server for matching with other IAs at steps 14*l* and 14*r*.

Referring again to FIG. 1, a next step of a method according to an embodiment is matching hash values and time stamps in the cloud. A method of matching according to an embodiment is as follows:

The identification codes of each of the IAs to be connected are compared at two levels, at step 15. The time stamp is used as a first-level matching key to narrow the matching range, and then the hash value is used as a second-level matching key for more accurate matching. Then, IAs with the same identification codes connect with each other, at step 16.

When different intelligent assistants use different methods or services to convert the voice to text, incorrect converting may occur on different conversation contents. In that case, some of the text segments generated by different intelligent assistants may be different than each other. This differentiation can also occur even for those intelligent assistants that use the same 'speech to text' method. The different text segments will have different hash values. In that context, a method according to an embodiment should not require that all hash values be equal. As long as a minimum predetermined number, referred to as a false acceptance rate, of hash values for different intelligent assistants have the same values, then their conversation content is considered to be the same, and a connection is established for them. Thus, for matching purposes, it is not necessary for the identification codes of an IA to be the exactly the same as those of another IA.

For privacy and security, only the identification codes would be exposed on the cloud, not the actual conversation content.

A next step of a method according to an embodiment is for the IAs to collaboratively work with each other. After connections among all IAs are established, these IAs work together to perform a variety of collaborative tasks, at step 17, in addition to continuing to monitor the conversation. According to one example, a process of FIG. 1 can perform a collaboration such as adding an event into a calendar based on the monitoring of the conversations. Suppose User-1 is talking with User-2, and their respective intelligent assistants, IA-1 and IA-2, are monitoring and caching their conversation content. User-1 and User-2 are planning to have a meeting next week, and their intelligent assistants perceive their intention by a cognitive analysis of the conversation. But in this step, the IAs only know a meeting needs to be created, but do not know who should be invited. However, based on the method according to an embodiment as illustrated in FIG. 1, IA-1 and IA-2 both would find each other on a cloud server using the processed conversation content data. That is, an IA identifies from the account of the other IA who should be invited into the meeting being currently planned. The IA invites the other IA to create a meeting event in a calendar.

A method according to embodiments of the disclosure can automatically process conversations and establish connections, without any human intervention. Embodiments are suitable for most conversation scenarios, and are not limited to conversations between IA enabled smart phones. For example, methods according to embodiments can be used in face-to-face conversation, shared telephone/video conferences, etc. The mobile units being connected can be any type of handheld computing device, such as watches, smartphones, phablets, tablets, or laptop computers, and can even form connections to non-mobile devices, such as desktop computers. The connections among IAs can be established quickly with a two level matching according to an embodiment, and only hash values and time stamps, not conversation content, are sent to cloud, to protect the privacy and security of the conversation.

System Implementations

It is to be understood that embodiments of the present disclosure can be implemented ire various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e,g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows::

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
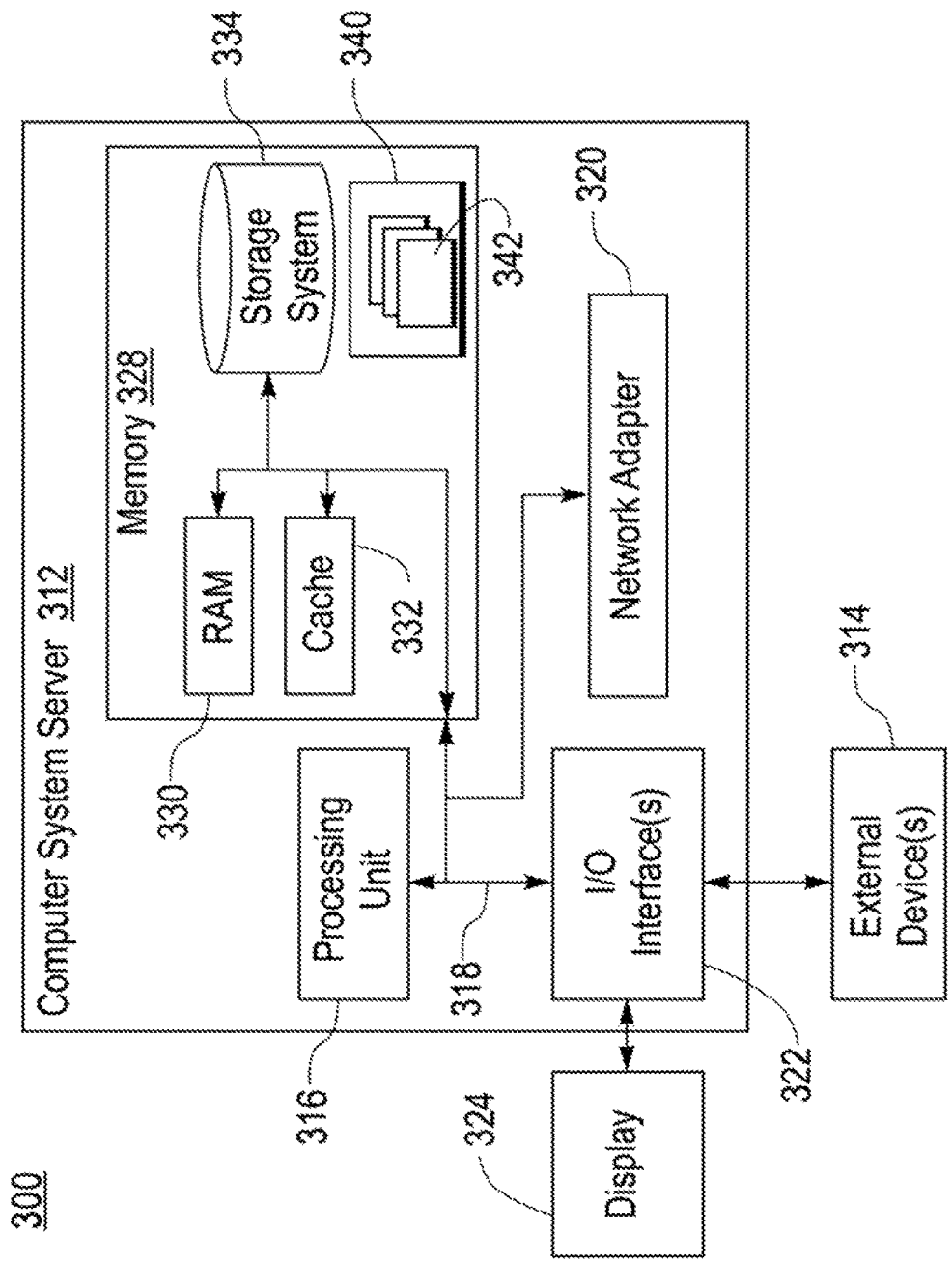
FIG. 3 is a schematic of an exemplary cloud computing node that implements an embodiment of the disclosure.

Referring now to FIG. 3, a schematic of an example of a cloud computing node is shown. Cloud computing node 310 is only one example of a suitable cloud computing node and is not intended to suggest any limitation as to the scope of use or functionality of embodiments of the disclosure described herein. Regardless, cloud computing node 310 is capable of being implemented and/or performing any of the functionality set forth herein above.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the disclosure as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
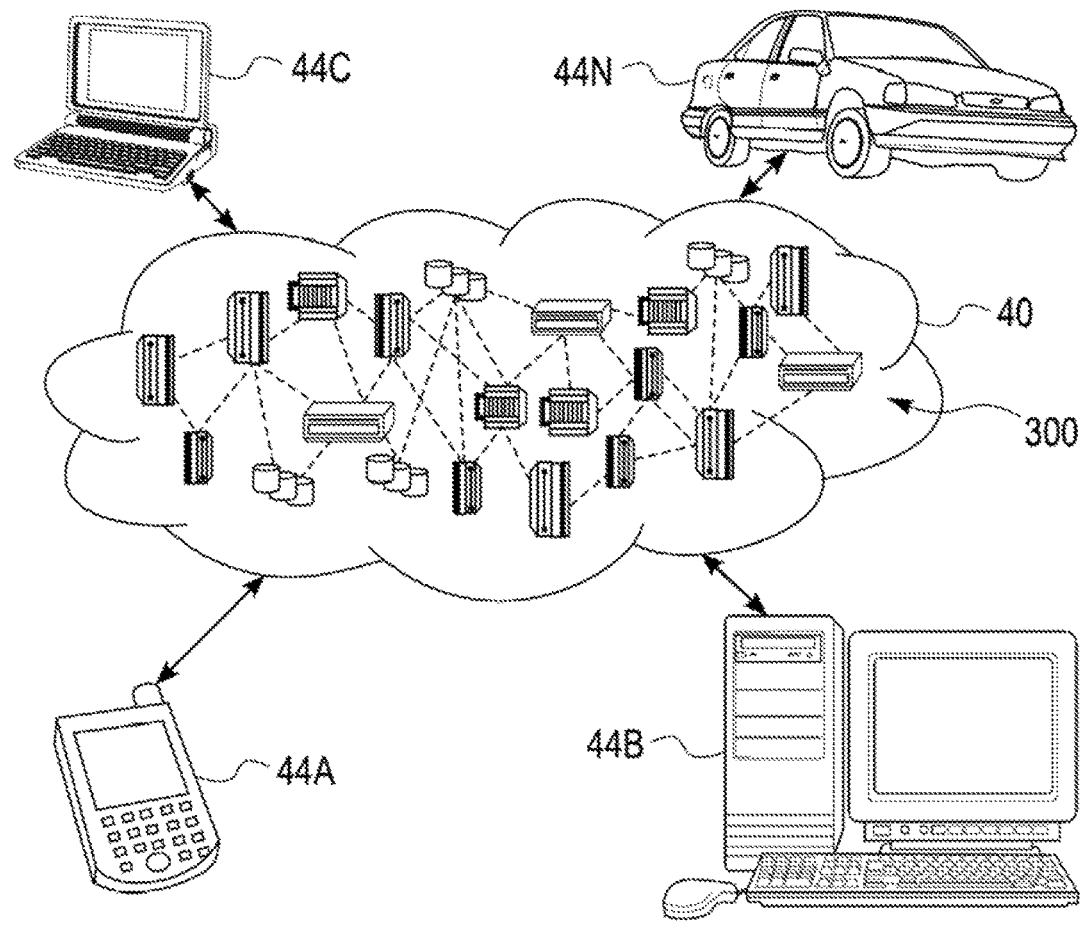
FIG. 4 shows an exemplary cloud computing environment according to embodiments of the disclosure.

Referring now to FIG. 4, illustrative cloud computing environment 40 is depicted. As shown, cloud computing environment 40 comprises one or more cloud computing nodes 300 with which local computing devices used by cloud consumers, such as, for example, personal digital assistant (PDA) or cellular telephone 44A, desktop computer 44B, laptop computer 44C, and/or automobile computer system 44N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 300 and cloud computing environment 40 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of establishing a conversation between intelligent assistants, comprising the steps of:
   monitoring, by an intelligent assistant installed in a computing device, a conversation between a user of said computing device and one or more other persons, in real-time;
   determining, by the intelligent assistant, that a connection needs to be established with at least one other intelligent assistant associated with one of the one or more other persons;
   subdividing content of the user's conversation monitored over a predetermined period of time into a plurality of segments, and associating a time stamp with each segment;
   hashing each of the plurality of segments wherein a hash value is associated with each segment;
   transmitting the user's hash values and time stamps for each segment to a cloud-based server for matching pairs of the hash values and their time stamps with hash values and time stamps received from one or more intelligent assistants associated with the one or more other persons; and
   establishing a connection between the user's intelligent assistant and an intelligent assistant of at least one of the one or more other persons, when, based on the matching, the user's hash value and time stamp for one or more segments of the conversation match hash values and time stamps of one or more conversation segments of the at least one of the one or more other persons.

2. The method of claim 1, wherein monitoring the conversation includes
   capturing voice content over the predetermined period of time,
   converting the voice content to text, and
   saving the text in a computer-accessible storage.

3. The method of claim 1, wherein subdividing the user's conversation content monitored over a predetermined period of time into a plurality of segments comprises
   subdividing the predetermined period of time into subintervals and
   subdividing the conversation content text into segments that correspond to each subinterval,
   wherein each time stamp is associated with a subinterval of the predetermined period of time.

4. The method of claim 1, wherein subdividing the user's conversation content monitored over a predetermined period of time into a plurality of segments comprises
   subdividing the conversation content text into segments that have a same number of units, wherein a unit is one of a character, a word, or a sentence.

5. The method of claim 1, wherein matching pairs of the hash values and their time stamps with hash values and time stamps received from one or more intelligent assistants associated with the one or more other persons includes
   comparing a user's segment time stamp with a segment time stamp received from one of the one or more intelligent assistants associated with the one or more other persons, and
   comparing a user's segment hash value with a segment hash value received from one of the one or more intelligent assistants associated with the one or more other persons.

6. The method of claim 1, wherein each of the one or more other persons is monitoring the conversation using an intelligent assistant installed in each of their computing devices.

7. A non-transitory program storage device readable by a computer, tangibly embodying a program of instructions executed by the computer to perform the method steps for establishing a conversation between intelligent assistants installed in computing devices, comprising the steps of:
   receiving, by a cloud based server, hash values and time stamps for a plurality of conversation text segments for two or more person-to-person conversations from two or more intelligent assistants residing in respective computing devices, wherein each of the plurality of text segments is associated with a hash value that represents content of the text segment and a time stamp, wherein each of the two or more conversations includes some of the plurality of conversation text segments;
   matching, by the cloud based server, pairs of the hash values and their time stamps received from a first of the two or more intelligent assistants with hash values and time stamps received from at least a second of the two or more intelligent assistants; and
   establishing, by the cloud-based server, a connection between the first intelligent assistant and the at least second intelligent assistant of the two or more intelligent assistants, when the hash values and time stamps for one or more segments of the conversation received from the first intelligent assistant match hash values and time stamps of one or more conversation segments received from the at least second intelligent assistant,
   wherein matching pairs of the hash values and their time stamps received from a first of the two or more intelligent assistants with hash values and time stamps received from at least a second of the two or more intelligent assistants includes
      comparing a segment time stamp received from the first intelligent assistant with a segment time stamp received from the at least second intelligent assistant, and
      comparing a segment hash value received from the first intelligent assistant with a segment hash value received from the at least second intelligent assistant.

8. The computer readable program storage device of claim 7, the method further comprising
- monitoring, by one of the two or more intelligent assistants, a conversation between a user of a computing device of said one of the two or more intelligent assistants and one or more other persons, in real-time;
- determining, by the intelligent assistant, that a connection needs to be established with at least one other intelligent assistant associated with one of the one or more other persons;
- subdividing content of the user's conversation monitored over a predetermined period of time into a plurality of segments, and associating a time stamp with each segment;
- hashing each of the plurality of segments wherein a hash value is associated with each segment; and
- transmitting the user's hash values and time stamps for each segment to a cloud-based server.

9. The computer readable program storage device of claim 8, wherein monitoring the conversation includes
- capturing voice content over the predetermined period of time,
- converting the voice content to text, and
- saving the text in a computer-accessible storage.

10. The computer readable program storage device of claim 8, wherein subdividing the user's conversation content monitored over a predetermined period of time into a plurality of segments comprises
- subdividing the predetermined period of time into subintervals and
- subdividing the conversation content text into segments that correspond to each subinterval,
- wherein each time stamp is associated with a subinterval of the predetermined period of time.

11. The computer readable program storage device of claim 8, wherein subdividing the user's conversation content monitored over a predetermined period of time into a plurality of segments comprises
- subdividing the conversation content text into segments that have a same number of units, wherein a unit is one of a character, a word, or a sentence.

12. The computer readable program storage device of claim 8, wherein each of the one or more other persons is monitoring the conversation using an intelligent assistant installed in each of their computing devices.

* * * * *